United States Patent [19]

Savage

[11] 4,323,266
[45] Apr. 6, 1982

[54] MOTOR VEHICLE PRIORITY CONTROL SYSTEM FOR OPERATING LEVELING AND WASHING SYSTEMS FROM A SINGLE SOURCE OF COMPRESSED AIR

[75] Inventor: Jack W. Savage, Centerville, Ohio

[73] Assignee: General Motors Corporation, Detroit, Mich.

[21] Appl. No.: 234,368

[22] Filed: Feb. 13, 1981

[51] Int. Cl.³ .............................................. B60G 11/26
[52] U.S. Cl. ............................... 280/707; 239/284 A; 280/DIG. 1
[58] Field of Search ................. 280/6 H, DIG. 1, 707; 15/250 A; 239/284 R, 284 A

[56] References Cited

U.S. PATENT DOCUMENTS 4,026,468  5/1977  Tinder et al. .................... 239/284 R
4,105,216  8/1978  Graham et al. .................... 280/707
4,248,383  2/1981  Savage et al. .................. 239/284 A

FOREIGN PATENT DOCUMENTS 2511091  9/1975  Fed. Rep. of Germany ... 15/250 A
2517960  11/1976  Fed. Rep. of Germany ... 239/284 R
2540429  4/1977  Fed. Rep. of Germany ... 239/284 A Primary Examiner—David M. Mitchell
Assistant Examiner—Ross Weaver
Attorney, Agent, or Firm—Mark A. Navarre

[57] ABSTRACT

A control unit for interfacing a single motor-driven air compressor with both an automatic vehicle leveling control system and a headlamp washer control system. The washer and leveling system commands are serviced according to a predetermined priority schedule so that interaction between the two systems is avoided.

4 Claims, 4 Drawing Figures

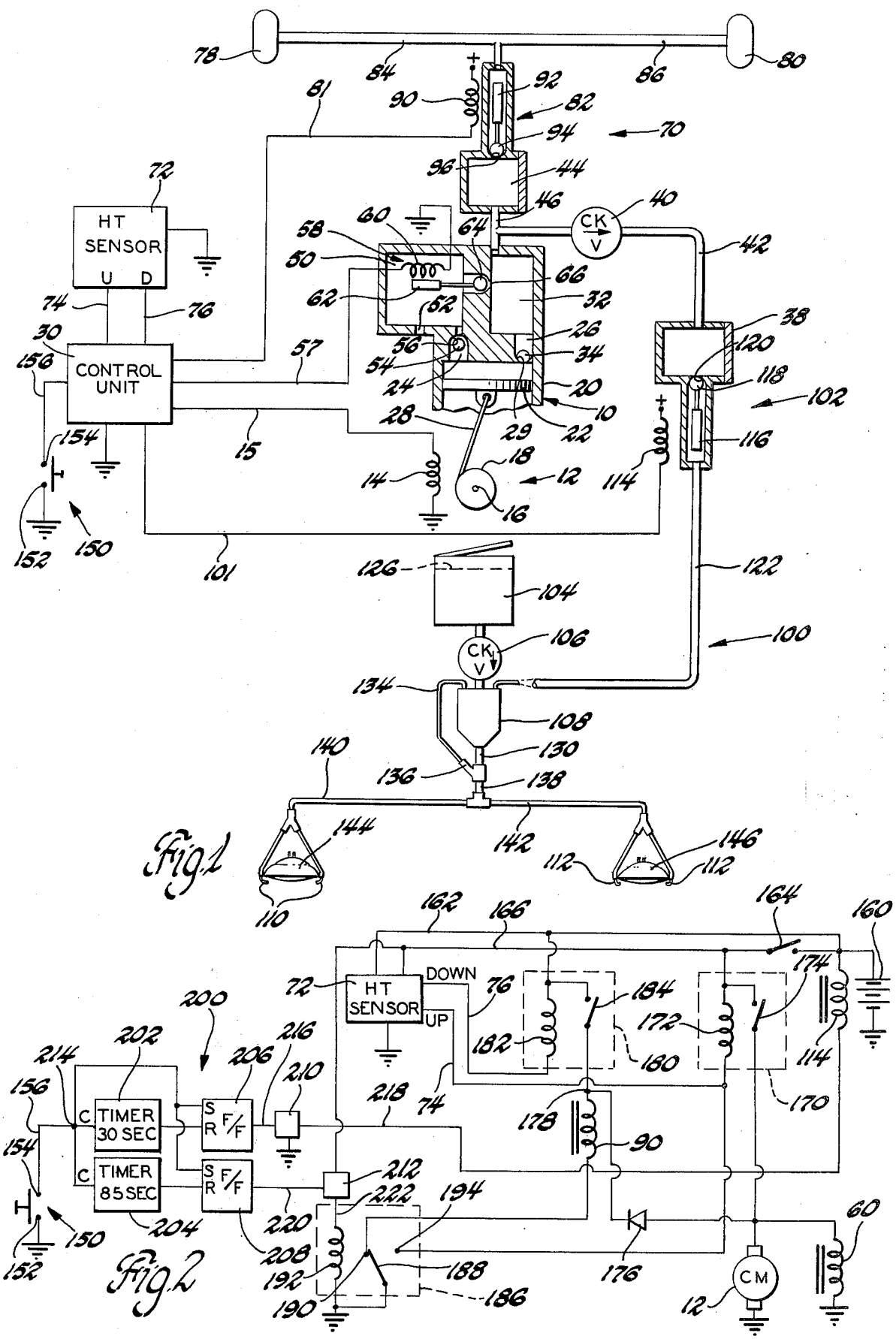

MOTOR VEHICLE PRIORITY CONTROL SYSTEM FOR OPERATING LEVELING AND WASHING SYSTEMS FROM A SINGLE SOURCE OF COMPRESSED AIR

This invention relates to a headlamp washer system and an automatic leveling system for a motor vehicle and more particularly to a control interface for operating both systems from a single source of compressed air.

Headlamp washer systems using a source of compressed air to spray a quantity of water or cleaning fluid onto a glass surface are well known in the prior art, one such system being disclosed in U.S. patent application Ser. No. 83,103, filed June 18, 1979 and allowed on Aug. 5, 1980, now U.S. Pat. No. 4,248,383. In that system a motor-driven air compressor is periodically operated to maintain an air ballast above a reference pressure, and a washing routine is performed by applying the ballast air pressure to a liquid storage container for directing a high pressure fluid spray against the surface to be cleaned.

Automatic motor vehicle leveling systems utilizing a source of compressed air for raising or lowering the sprung mass of a motor vehicle are also well known in the prior art, one such system being disclosed in the U.S. Patent to Graham No. 4,168,840, issued on Sept. 25, 1979. In that system, an air compressor is energized to raise the level of the vehicle and an exhaust valve is energized to lower the level of the vehicle.

In order to incorporate both a leveling system and a washer system on a motor vehicle, separate air compressors might be provided for each system. Although this approach is simple in concept, it necessarily entails substantial weight and cost penalties. However, the use of a single air compressor to operate both systems creates various problems in situations where the control functions of the two systems interfere. For example, a wash command for the headlamp washer system might improperly adjust the level of the motor vehicle if the leveler exhaust valve were open at the time.

Accordingly, it is an object of this invention to provide an interface for operating a headlamp washer system and an automatic leveling system from a single source of compressed air wherein the operation of one system does not adversely affect the operation of the other system.

It is another object of this invention to provide an interface for operating a motor vehicle headlamp washer system and a motor vehicle leveling system wherein commands from the two systems are serviced according to a predetermined priority schedule to prevent the operation of one system from affecting the operation of the other system.

These objects are carried forward with a conventional automatic leveling system and headlamp washer system of the general type referred to above and an electronic interface for scheduling the operation of each system according to a predetermined priority to prevent mutual interference. Various embodiments are disclosed, each implementing a different service priority. A first embodiment gives full priority to the headlamp washer system, a second embodiment gives priority to the headlamp washer system but also allows a leveling "raise" operation, and a third embodiment gives full priority to the automatic leveling system.

FIG. 1 is a schematic illustration of the overall control system including the washer system, the leveler system and the control connections.

FIG. 2 is a circuit diagram of the control unit depicted in FIG. 1 according to a first embodiment of this invention giving total priority to the washer system.

Figure 3:
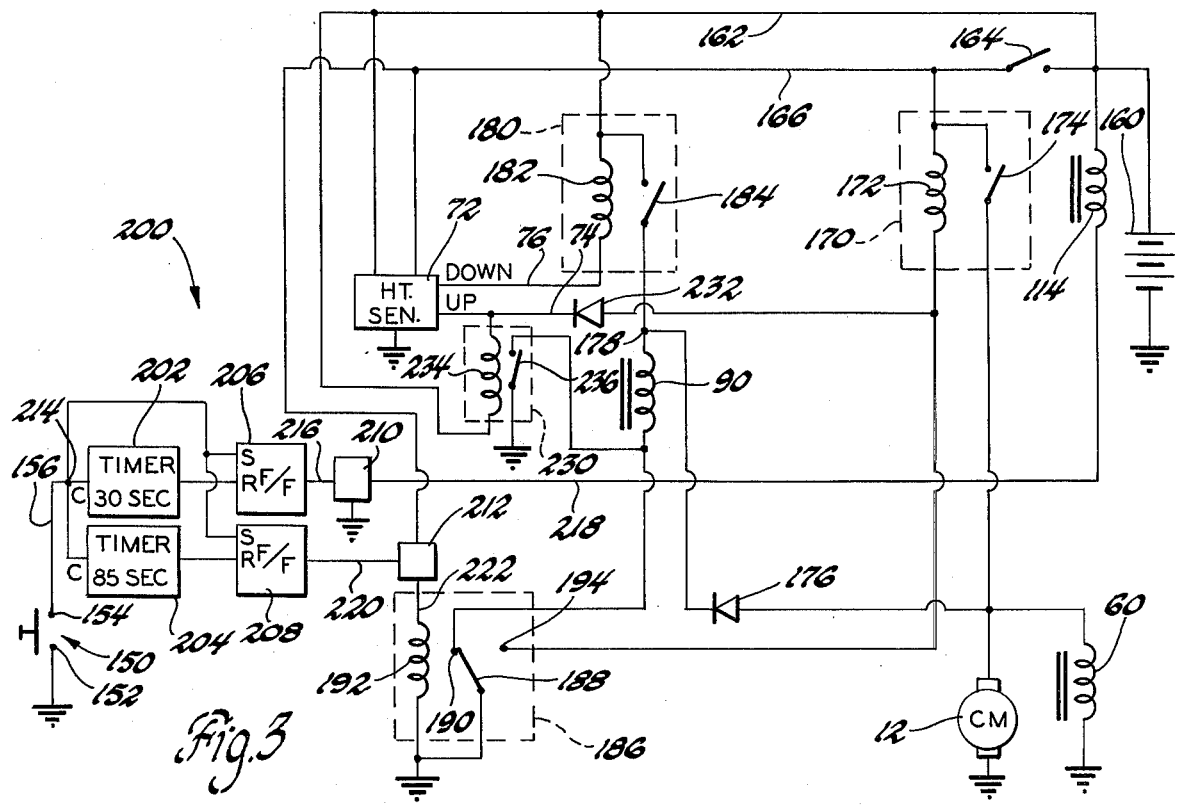
FIG. 3 is a circuit diagram of the control unit depicted in FIG. 1 according to a second embodiment giving priority to both the washer system and an "up" or "raise" command from the leveling system.

Referring now particularly to FIG. 1 reference numeral 10 generally designates a conventional air compressor driven by a conventional electric motor 12. Motor 12 comprises an armature winding 14, an output shaft 16 and a crankshaft 18 rigidly connected to output shaft 16. Compressor 10 comprises a cylinder head 20, a piston 22, an inlet port 24 and an outlet port 26. Connecting arm 28 connects crankshaft 18 to piston 22 so that when control unit 30 energizes motor winding 14 via line 15, motor 12 drives piston 22 in a reciprocating manner. During a compression stroke (upward) of piston 22, outlet chamber 32 receives pressurized air from compressor 10 through outlet port 26 and during an intake stroke (downward) stopcock ball 34 is urged against seat 29 of port 26 to prevent airflow from outlet chamber 32 back into cylinder head 20. Chamber 32 is connected to washer air reservoir 38 via check valve 40 and pressure line 42, and to leveler air dryer chamber 44 via pressure line 46. Intake chamber 50 has a filtered intake port 52 and is connected to compressor cylinder head 20 via inlet port 24. During an intake stroke, air is drawn into cylinder head 20 through inlet port 24, and during a compression stroke, stopcock ball 54 is urged against seat 56 of inlet port 24 to prevent pressurized air in cylinder head 20 from entering intake chamber 50. Although not shown in FIG. 1, it will be appreciated that compressor 10 includes means for limiting the movement of stopcock balls 34 and 54 so as to maintain them in the respective port 26 or 24. Intake chamber 50 is also connected to outlet chamber 32 via a solenoid-operated fill valve designated generally by reference numeral 58. Solenoid valve 58 includes an energization coil 60, a plunger 62 and a stopcock ball 64 connected to plunger 62 and adapted to open or close passage 66 between inlet chamber 50 and outlet chamber 32. Solenoid valve 58 is normally open (as shown) to allow passage of air between outlet chamber 32 and inlet chamber 50 through opening 66, but may be energized by control unit 30 via line 57 to close and prevent the passage of air between the two chambers.

Reference numeral 70 generally designates the pneumatic portion of a conventional automatic leveling system, and comprises air dryer chamber 44, a solenoid-operated blocker valve designated generally by reference numeral 82, and pressure lines 84 and 86 connecting the outlet of blocker valve 82 to pneumatic shock absorbers 78 and 80. Air dryer chamber 44 contains a desiccant for absorbing the moisture from air that is supplied to shock absorbers 78 and 80. Blocker valve 82 comprises an energization coil 90, a plunger 92 and a stopcock ball 94 connected to plunger 92. Blocker valve 82 is normally closed (as shown) so that ball 94 is urged against seat 96 to prevent the passage of air between air dryer chamber 44 and shock absorbers 78 and 80, but may be energized by control unit 30 via line 81 to an open position to allow the passage of air between shock absorbers 78 and 80 and air dryer chamber 44.

Height sensor 72 is responsive to the level of the sprung mass of the motor vehicle relative to a stationary frame member and is adapted to provide command signals on conductors 74 or 76 if the sensed level is significantly different than a reference level. The command signals on conductors 74 or 76 indicate that either an upward (U) or a downward (D) movement of pneumatic shock absorbers 78 and 80 is required to restore the vehicle level to the reference level. A height sensor meeting these specifications is described in detail in the above-referenced U.S. Patent to Graham No. 4,168,840.

The up or down command signals generated by height sensor 72 are applied to control unit 30, and control unit 30 selectively controls the energization of solenoid valves 58 and 82 and motor winding 14 in a manner to restore the level of the vehicle sprung mass to the reference level.

The washer system is generally designated by reference numeral 100 and comprises a solenoid-operated trigger valve 102, liquid storage container 104, check valve 106, delivery container 108 and dispensing nozzles 110 and 112. Solenoid valve 102 comprises an energization coil 114, a plunger 116 and a stopcock ball 118 connected to plunger 116. Plunger 116 is normally biased to the closed position as shown, urging ball 118 against seat 120 to prevent the passage of air between air reservoir 38 and delivery container 108. When control unit 30 energizes coil 114 via line 101, plunger 116 is moved to an open position allowing the passage of compressed air from reservoir 38 to delivery container 108 via air delivery passage 122. Liquid storage container 104 contains the fluid to be dispensed, and check valve 106 connects storage container 104 with delivery container 108. Check valve 106 thereby permits fluid flow from container 104 to container 108 but prevents flow in the reverse direction. A lower opening of delivery container 108 is connected to fluid delivery passage 130 and an upper opening is connected to a pneumatic delivery passage 134. Passages 130 and 134 are joined at fitting 136, the outlet of which is connected to washer passage 138, which is connected by tubing passages 140 and 142 to dispensing nozzles 110 and 112 respectively. Although not indicated in FIG. 1, it will be noted that a portion of delivery passage 122 should be located above the maximum fluid level 126 permitted in storage container 104. Likewise, fitting 136 and at least a portion of passage 138 must be located above fluid level 126. As shown in FIG. 1, dispensing nozzles 110 and 112 are positioned about headlamps 144 and 146 in a manner to direct fluid spray from container 108 onto the surface of the headlamps 144 and 146 when control unit 30 energizes solenoid valve 102.

A wash command is generated by momentarily closing switch 150 to connect contacts 152 and 154. Switch 150 is normally open as shown and may be located on the motor vehicle instrument panel for actuation by the operator of the vehicle. When switch 150 is actuated, conductor 156 connects an input of control unit 30 to ground potential and control unit 30 may then operate to control the energization of solenoid valves 102 and 58 and compressor motor 12 to initiate a washing sequence.

In order to service a wash command, control unit 30 must energize solenoid fill valve 58, compressor motor 12, and solenoid trigger valve 102. Pressurized air previously stored in reservoir 38 forces the liquid in delivery container 108 through nozzles 110 and 112 onto the surface of headlamps 144 and 146. Following the termination of a first time period sufficient to empty delivery container 108 and purge nozzles 110 and 112 of residual washing fluid, trigger valve 102 is deenergized. However, the energization of compressor motor 12 and solenoid fill valve 58 is maintained for a second time period sufficient to repressurize reservoir 38. When the second time period is terminated, compressor motor 12 and solenoid fill valve 58 are deenergized, completing a washing sequence.

Referring now to the operation of the leveling system, an up command from height sensor 72 is serviced by energizing solenoid blocker valve 82, solenoid fill valve 58, and compressor motor 12 to permit compressor 10 to increase the air pressure in shock absorbers 78 and 80. When the up command is terminated, all circuits are deenergized and blocker valve 82 maintains the shock absorber pressure. A down command from height sensor 72 is serviced by energizing blocker valve 82 to permit the air in shock absorbers 78 and 80 to escape through air drier 44, passage 66, and filtered inlet 52 to atmospheric pressure. It should be noted that the shock absorber exhaust air passes through the desiccant in air drier 44, reabsorbing the moisture it gave up during the servicing of an up command. When the down command is terminated, blocker valve 82 is deenergized to maintain the reduced shock absorber pressure. From the foregoing description of the servicing of the wash, up and down commands, it will be apparent that certain of the operations are not mutually exclusive. Specifically, a down command and a wash command cannot be serviced concurrently since the wash command requires that fill valve 58 and compressor motor 12 be energized and the down command requires that fill valve 58 and compressor motor 12 be deenergized. If it is attempted to service both commands concurrently, the level of the vehicle will be raised instead of lowered. Accordingly, some provision must be made for ensuring reliable and independent operation of the systems when wash and down commands are generated concurrently.

FIG. 2 shows a first embodiment of control unit 30 for compatibly operating both the washer system and the leveling system. The elements also depicted in FIG. 1 include wash switch 150, compressor motor 12, height sensor 72 and solenoid valve windings 60, 90, and 114. The vehicle storage battery 160 is connected directly to power supply line 162 and through ignition switch 164 to power supply line 166.

Relay 170 controls the energization of compressor motor 12 and fill valve winding 60, which are connected in parallel. When winding 172 of relay 170 is energized, normally open switch arm 174 is closed to connect power supply line 166 directly to the parallel combination of compressor motor 12 and fill valve winding 60 and through diode 176 to terminal 178 of blocker valve winding 90.

The energization of relay 180 is controlled by down output lead 76 of height sensor 72. When height sensor 72 energizes winding 182 of relay 180 to lower the level of the vehicle, normally open switch arm 184 closes to connect power supply line 162 to terminal 178 of blocker valve winding 90. Diode 176 prevents the energization of compressor motor 12 and winding 60 through switch arm 184 when winding 182 is energized.

The energization of relay 186 is controlled by a washer timing circuit (generally designated by reference numeral 200) as will later be described. Switch arm 188 of relay 186 normally connects contact 190 to ground potential as shown. When winding 192 of relay 186 is energized, switch arm 188 is actuated to open contact 190 and to connect contact 194 to ground potential. It will thus be seen that relay 186 is adapted to provide a ground return circuit for either blocker valve winding 90 or relay winding 172, depending upon the energization of winding 192.

Washer timing circuit 200 comprises a pair of resetable timer or delay circuits 202 and 204, a pair of R-S flip-flops 206 and 208, and a pair of power switches 210 and 212. Wash switch 150 is adapted to connect input terminal 214 of timing circuit 200 to ground potential when closed. Terminal 214 is connected to the clock inputs (C) of timers 202 and 204 and to the set (S) inputs of flip-flops 206 and 208. Timers 202 and 204 may be any solid state devices that receive an input signal at a clock (C) input terminal and thereafter reproduce the input pulse at an output terminal following a predetermined time delay. As noted in FIG. 2, timer 202 is adapted to delay an input signal 30 seconds and timer 204 is adapted to delay an input signal 85 seconds. It will be appreciated that acceptable performance may be achieved with somewhat different time delay periods, but that the indicated values constitute the preferred embodiment. The output terminals of timers 202 and 204 are connected to the reset (R) inputs of flip-flops 206 and 208. The non-inverting outputs of flip-flops 206 and 208 are connected to the control inputs of switches 210 and 212. Switches 210 and 212 may be any solid state or electromagnetic switching devices adapted to receive a control input and to make a connection between two conductors in response thereto. When output line 216 of flip-flop 206 assumes a logic 1 voltage level, switch 210 connects line 218 to ground potential and when the output line 220 of flip-flop 208 assumes a logic 1 voltage level, switch 212 connects conductor 222 to power supply line 166. Otherwise, the switchable connections in switches 210 and 212 remain open.

The operation of the height control portion of the circuit will now be described. When height sensor 72 determines that the level of the sprung mass of the vehicle should be lowered, output line 76 is connected to ground potential to energize winding 182 of relay 180. Such energization completes an energization circuit for blocker valve winding 90 comprising power supply line 162 and switch arms 184 and 188. As indicated in reference to FIG. 1, the energization of blocker valve winding 90 opens blocker valve 82 to allow shock absorber air to exhaust through normally open fill valve 58 and input port 52 to atmospheric pressure. When the vehicle sprung mass reaches a desired level, height sensor 72 opens line 76, and blocker valve 82 maintains the shock absorber pressure at the reduced level. When it is desired to raise the level of the vehicle sprung mass, output line 74 of height sensor 72 is connected to ground potential to energize relay winding 172 of relay 170. Such energization closes relay switch arm 174 to connect power supplyline 166 directly to compressor motor 12 and fill valve winding 60 and through diode 176 to terminal 178 of blocker valve winding 90. Accordingly, blocker valve winding 90, fill valve winding 60, and compressor motor 12 are all energized to enable compressor 10 to raise the level of the vehicle by increasing the pressure in shock absorbers 78 and 80. When the vehicle sprung mass reaches a desired level, height sensor 72 opens line 74, and blocker valve 82 maintains the shock absorber pressure at the elevated level. The above described operation assumes that relay 186 remains deenergized to provide a ground return path for blocker valve 90 through switch arm 188 as earlier explained.

The operation of the washer circuit will now be described. When washer switch 150 is momentarily closed, to connect terminal 214 of washer timing circuit 200 to ground potential, an input pulse is applied to the clock (C) inputs of timers 202 and 204, and the output lines 216 and 220 of flip-flops 206 and 208 are set to a logic 1 voltage level. Accordingly, switch 210 is actuated to connect line 218 to ground potential for energizing trigger valve winding 114, and switch 212 is actuated to connect power supply line 166 to winding 192 of relay 186. The resultant actuation of switch arm 188 of relay 186 disconnects the ground return path for blocker valve winding 90, and connects contact 194 to ground potential for energizing compressor motor 12 and fill valve winding 60. As indicated in reference to FIG. 1, such energization opens trigger valve 102 to commence a washing sequence and operates compressor 10 to maintain a given pressure in air reservoir 38 during the last portion of the washing sequence. After the 30 second delay of timer 202 has elapsed, flip-flop 206 is reset to open switch 210 and deenergize trigger valve winding 114 to terminate the liquid dispensing portion of the washing sequence. As indicated earlier, the 30 second delay of timer 202 is longer than the time required to propel the liquid contents of dispensing container 108 onto the headlamps 144 and 146. Between the expiration of the 30 second delay of timer 202 and the 85 second delay of timer 204, compressor motor 12 and fill valve winding 60 remain energized through switch arm 188 of relay 186 in order to repressurize air reservoir 38. When the 85 second delay of timer 204 has elapsed, flip-flop 208 is reset to open switch 212 and deenergize relay 186, restoring the ground return path for blocker valve winding 90, and completing the washing sequence.

It will be noted that during the washing sequence, relay 186 prevents the energization of blocker valve winding 90 so that the shock absorber pressure and hence the level of the motor vehicle will not be effected by the servicing of a wash command. It will also be noted that if washer switch 150 is depressed during a leveling operation, the blocker valve winding energization circuit will be interrupted by relay 186 to disable further leveling adjustment until the wash sequence is completed. The control circuit shown in FIG. 2 thus operates to give full priority to a wash command.

FIG. 3 shows a circuit diagram of control unit 30 according to a second embodiment of this invention. The circuit shown in FIG. 3 is like the circuit shown and described in reference to FIG. 2 except for the addition of relay 230 and diode 232. The control winding 234 for relay 230 is connected between power supply line 162 and the up output line 74 of height sensor 72 so that winding 234 is energized each time height sensor 72 determines that the level of the vehicle should be raised. Each time the up command is given, normally open switch arm 236 of relay 230 closes to provide a ground return path for blocker valve winding 90. Accordingly, it will be seen that the circuit shown in FIG. 3 allows the leveling system to perform a raise operation even during a wash sequence, but prevents the servicing of a down command during a wash sequence. Diode 232 functions to prevent the energization of winding 234 through switch arm 188 of relay 186. It will be seen in reference to FIG. 1 that the concurrent servicing of an up command and a wash command presents no undesired response in either the washer system or the leveling system so long as compressor 10 is capable of supplying a sufficient quantity of compressed air to both systems.

Figure 4:
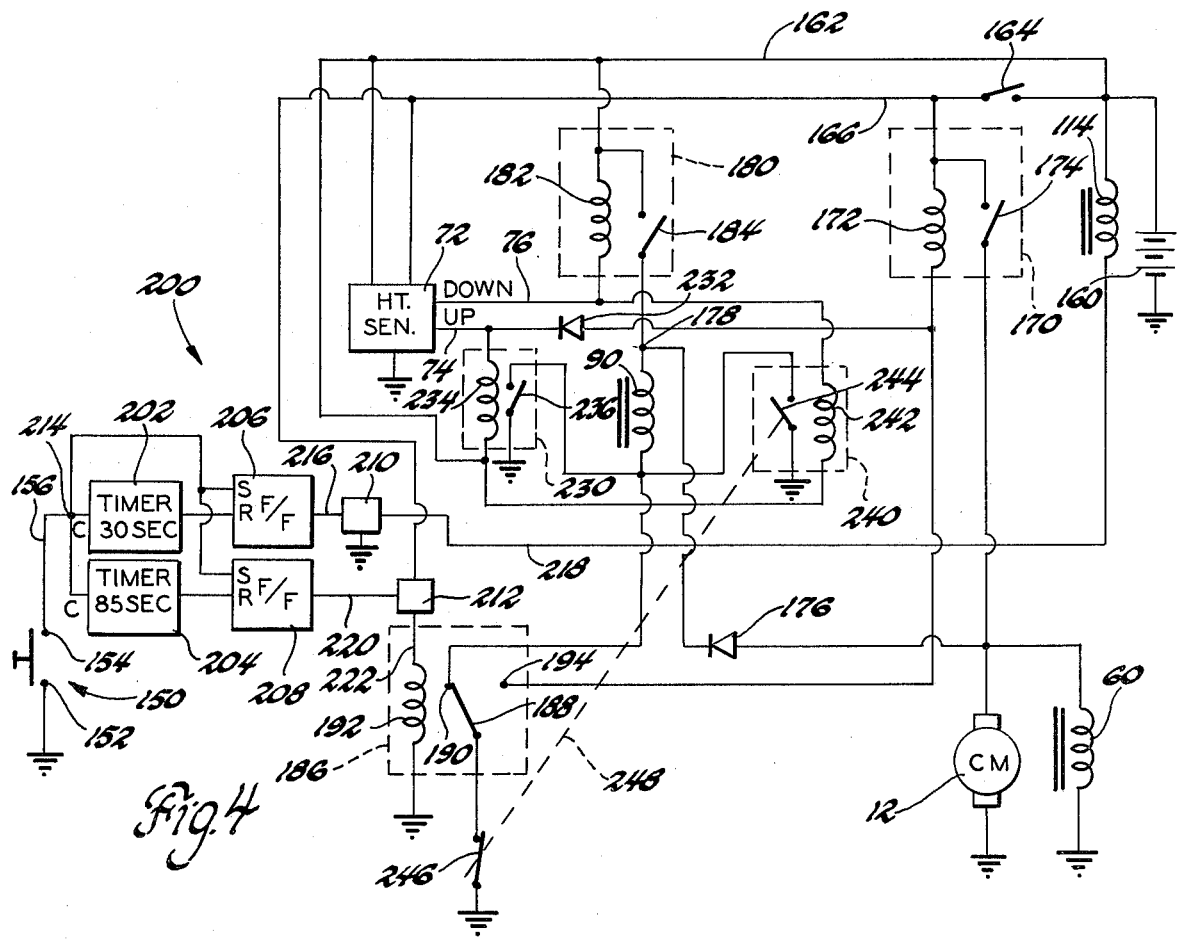
FIG. 4 is a circuit diagram of the control unit depicted in FIG. 1 according to a third embodiment giving total priority to the automatic leveler system.

FIG. 4 shows a circuit diagram for control unit 30 according to a third embodiment of this invention. The circuit shown in FIG. 4 is like the one shown in FIG. 3 except for the addition of relay 240. Control winding 242 of relay 240 is connected between down output lead 76 of height sensor 72 and power supply line 162 so that it is energized each time height sensor 72 issues a down command to lower the level of the vehicle sprung mass. Relay 240 has two switch arms, 244 and 246, which are ganged together (as indicated by dotted line 248) and actuated in response to the energization of winding 242. When winding 242 is energized, normally open switch arm 244 is closed to provide a ground return path for blocker valve winding 90, and normally closed switch arm 246 is opened to disconnect switch arm 188 of relay 186 from ground potential. In operation, switch arm 246 is opened each time height sensor 72 issues a down command so that washer timing circuit 200 cannot energize compressor motor 12 to service a wash command. Although compressor motor 12 is disabled during the servicing of a down command, trigger valve winding 114 may still be energized through switch 210 in order to use the air pressure stored in reservoir 38 to dispense cleaning fluid onto headlamps 144 and 146. The consequence of disabling compressor motor 12 under such conditions is that air reservoir 38 is not automatically completely refilled, and accordingly the next wash cycle would not be quite as effective as a normal wash cycle. The up or down leveling system commmands are serviced whether or not a wash sequence is in progress, and thus the circuit shown in FIG. 4 is said to give total priority to the leveling system.

As indicated above, the embodiments in FIGS. 2-4 service the up, down and wash commands according to different priority schedules. The use of one embodiment as compared to another is a matter of choice depending upon which priority schedule is considered to be most desirable.

The embodiments of the invention in which an exclusive property or privilege is claimed are defined as follows:

1. In a motor vehicle, a controller for operating a pressurized washer system and a leveling system from a single electrically energizable air compressor wherein compressed air in said leveling system is adapted to be exhausted to atmospheric pressure through the air intake of said compressor, said controller comprising:

supply lines connecting said compressor to said leveling system and to said washer system;

electrically energizable blocker valve means in the supply line between said compressor and said leveling system effective to control the connection of said compressor to said leveling system;

first control means responsive to the level of the sprung mass of said motor vehicle for generating up or down commands for said leveling system, said leveling system being operative at times to energize said compressor and open said blocker valve means in response to an up command to raise the level of said vehicle, and to deenergize said compressor and open said blocker valve means in response to a down command to lower the level of said vehicle by exhausting air through the air intake of said compressor;

second control means selectively actuable to generate a wash command for said washer system, said washer system being operative at times to energize said compressor in response to a wash command for dispensing a cleansing solution onto a motor vehicle surface; and means for controlling the energization of said blocker valve means and said compressor as a function of the commands generated by said first and second control means in a manner to service said commands according to a predetermined priority wherein either said blocker valve means or said compressor is disabled in response to a command that is given priority so that said leveling system and said washer system will not interact when a down command and a wash command are generated concurrently.

2. In a motor vehicle, a controller for operating a pressurized washer system and a leveling system from a single electrically energizable air compressor wherein compressed air in said leveling system is adapted to be exhausted to atmospheric pressure through the air intake of said compressor, said controller comprising:

supply lines connecting said compressor to said leveling system and to said washer system;

electrically energizable blocker valve means in the supply line between said compressor and said leveling system effective to control the connection of said compressor to said leveling system;

first control means responsive to the level of the sprung mass of said motor vehicle for generating up or down commands for said leveling system, said leveling system being operative at times to energize said compressor and open said blocker valve means in response to an up command to raise the level of said vehicle, and to deenergize said compressor and open said blocker valve means in response to a down command to lower the level of said vehicle by exhausting air through the air intake of said compressor;

second control means selectively actuable to generate a wash command for said washer system, said washer system being operative at times to energize said compressor in response to a wash command for dispensing a cleansing solution onto a motor vehicle surface; and means effective in response to the generation of a wash command for inhibiting the energization of said blocker valve means, so that said washer system is given service priority over said leveling system to avoid interference therebetween.

3. In a motor vehicle, a controller for operating a pressurized washer system and a leveling system from a single electrically energizable air compressor wherein compressed air in said leveling system is adapted to be exhausted to atmospheric pressure through the air intake of said compressor, said controller comprising:

supply lines connecting said compressor to said leveling system and to said washer system;

electrically energizable blocker valve means in the supply line between said compressor and said leveling system effective to control the connection of said compressor to said leveling system;

first control means responsive to the level of the sprung mass of said motor vehicle for generating up or down commands for said leveling system, said leveling system being operative at times to energize said compressor and open said blocker valve means in response to an up command to raise the level of said vehicle, and to deenergize said compressor and open said blocker valve means in response to a down command to lower the level of said vehicle by exhausting air through the air intake of said compressor;

second control means selectively actuable to generate a wash command for said washer system, said washer system being operative at times to energize said compressor in response to a wash command for dispensing a cleansing solution onto a motor vehicle surface; and means effective in response to the generation of a wash command for preventing said leveling system from energizing said blocker valve means to service a down command so that said wash command is given service priority over said down command to avoid mutual interference between said washer and leveling systems.

4. In a motor vehicle, a controller for operating a pressurized washer system and a leveling system from a single electrically energizable air compressor wherein compressed air in said leveling system is adapted to be exhausted to atmospheric pressure through the air intake of said compressor, said controller comprising:

supply lines connecting said compressor to said leveling system and to said washer system;

electrically energizable blocker valve means in the supply line between said compressor and said leveling system effective to control the connection of said compressor to said leveling system;

first control means responsive to the level of the sprung mass of said motor vehicle for generating up or down commands for said leveling system, said leveling system being operative at times to energize said compressor and open said blocker valve means in response to an up command to raise the level of said vehicle, and to deenergize said compressor and open said blocker valve means in response to a down command to lower the level of said vehicle by exhausting air through the air intake of said compressor;

second control means selectively actuable to generate a wash command for said washer system, said washer system being operative at times to energize said compressor in response to a wash command for dispensing a cleansing solution onto a motor vehicle surface; and means effective in response to the generation of a down command for preventing the energization of said air compressor by said washer system, so that said down command is given service priority over said wash command to avoid mutual interference between said washer and leveling systems.

* * * * *